United States Patent Office 3,163,680
Patented Dec. 29, 1964

3,163,680
PROCESS FOR THE PREPARATION OF
POLYALCOHOLS
Bernard Audouze, Royat, Pierre Grancher, Saint-Chamas, and Simone Marsaule and Maurice Ortigues, Toulouse, France, assignors to Etat Francais, represente par le Ministre des Armees (Direction des Poudres), Paris, France
No Drawing. Filed Jan. 26, 1961, Ser. No. 84,985
Claims priority, application France, Jan. 30, 1960,
817,149
5 Claims. (Cl. 260—637)

The present invention relates to the production of polyalcohols and is concerned particularly with the production of methylolalkanes.

It is known that methylolalkanes can be prepared by the action of formaldehyde on an aliphatic carbonyl compound having a formula such as those given below:

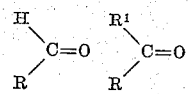

in which R and $R^1$ can represent a hydrogen atom or a saturated alkyl radical.

This reaction occurs in the presence of a base, such as calcium carbonate, and in the presence of a large quantity of water. It produces the desired polyalcohol, a metal formate, such as calcium formate, and secondary products with complex functions, such as aldoses, polyalcohols other than those desired and acetals.

In the known processes, the methylolalkanes are separated by crystallization in an anhydrous organic medium or in water; this crystallization is difficult to carry out because of the presence of the formate and also because of the presence of organic impurities. The formate diminishes the quality of the crystallized polyalcohol and the organic impurities cause a very substantial lowering of the crystallization yield. Also, they may even prevent the crystallization taking place.

It is therefore an object of the present invention to provide an improved process for the preparation of polyalcohols, such as methylolalkanes, which allows separation of the product with a high degree of purity and with a high yield.

Accordingly, the invention comprises a process for the preparation of polyalcohols, in which formaldehyde and an aliphatic carbonyl compound are reacted in an aqueous alkaline solution, then the pH of the solution is adjusted to between 4 and 7, to form a synthesis solution containing the desired polyalcohol, and to which, after removing any unchanged formaldehyde, there is added an aliphatic primary N-dialkyl-substituted amide of the formula:

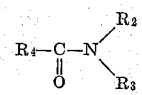

in which $R_4$ represents a hydrogen atom or an alkyl radical and $R_2$ and $R_3$ represent alkyl radicals, the mixture of solutions thus obtained is concentrated at a temperature between 50° and 130° C. to eliminate water and transform certain of the organic impurities and cause precipitation of mineral salts and the desired polyalcohol is then recovered.

According to a preferred feature of the invention, the aqueous solution from the synthesis of the polyalcohol is adjusted to a pH slightly below 7 and preferably around 5; this solution is preferably freed from excess formaldehyde; it can however, contain free or combined formaldehyde without affecting the operation of the process.

Before proceeding with separation of the polyalcohol according to the invention, the synthesis solution can be pre-concentrated at a temperature not exceeding 120° C.

According to another feature of the invention, there is then added to such a synthesis solution a volume amounting to from 0.1 to 10 times the partial volume of the polyalcohol contained in the synthesis solution, of an amide corresponding to the formula given above. There can be used as the addition product at this stage, any product which possesses the following characteristics:

Its chemical reactivity should be nil with respect to water, acids, aldehydes and alcohols;
Its solvent power should be nil with regard to mineral salts contained in the synthesis solution;
It should not give azeotropism with water;
Its boiling point should be higher than that of water, but should also be sufficiently low so that the separation of this product never necessitates the use of a temperature higher than 130° C.

In carrying out the invention, there can be utilized as the product N-dimethylformamide, N-dimethylethanamide, N-diethylethanamide, N-diethylformamide and N-dipropylformamide.

The mixture of solutions obtained after addition of the product mentioned above is advantageously concentrated before complete elimination of the water. If this concentration is carried out with slight rectification of the vapours, the achievement of dehydration is marked by a very rapid variation in the temperature. This concentration should preferably take place at a temperature between 110° and 120° C.

Certain organic impurities contained in the solutions thus undergo a transformation; some liberate the desired polyalcohol within the liquid, which causes an increase in the yield of the extraction, and the impurities also liberate volatile compounds entrained in the water, which allows the crystallization to occur more easily.

During this concentration, the metal salts precipitate and can be recovered in a subsequent stage by filtration.

Also, a second concentration is desirably carried out so as to separate the polyalcohol from the greater part of the amide. This concentration can be carried out under a slight sub-pressure and at a temperature not exceeding 120° C. The achievement of the elimination of the amide is marked by a variation in temperature, but it is preferable not to seek total elimination of the amide which does not at all cause crystallization of the polyalcohol while if the syrup is overheated there is a risk of causing browning, which may alter the qualities of the polyalcohol extracted.

Crystallization of the polyalcohol is finally effected by adding to the syrup a solvent in which the polyalcohol is soluble in the hot and slightly soluble in the cold; there can be used for this purpose water, the amide employed itself, an ether, ester or an aliphatic ketone.

After the crystallization of the polyalcohol by cooling and separation of the crystals, the residual liquor can be reconcentrated and the residual syrup can likewise be recycled to any desired stage of the separation.

There is given below by way of example only non-limitative examples of the process according to the invention.

*Example 1*

500 parts of technical dimethylformamide were added to 1000 parts of an aqueous synthesis solution of pentaerythritol which essentially contained 92 parts of pentaerythritol, 76 parts of calcium formate, organic impurities and water.

Evaporation under atmospheric pressure was carried out. To eliminate all the water, the evaporation was continued until the temperature of the vapour attained 120° C. The calcium formate precipitated and was dried and then washed with 50 parts of hot dimethyl formamide; there was thus recovered 75.5 parts of calcium formate of 99.5% purity.

The filtrate containing the pentaerythritol was then dissolved in the hot in dimethyl formamide and cooled to 10° C. There was thus obtained 67 parts of a first yield which was washed with 5 parts of cold dimethyl formamide. The product obtained after drying had the following characteristics:

| | |
|---|---|
| Ash content _____ percent__ | 0 |
| Gardner colour index _____ | 3 |
| Melting point _____ ° C__ | 249 |
| Pentaerythritol _____ percent__ | 95.5 |
| Dipentaerythritol _____ do____ | 4.5 |

The new filtrate containing pentaerythritol dissolved in the cold in dimethyl formamide was again concentrated under reduced pressure and the volume of this filtrate was reduced to 50 parts; it was then cooled; the crystals obtained were then dewatered and dried. There was thus obtained 20 parts of a second yield having the following characteristics:

| | |
|---|---|
| Ash content _____ percent__ | 0.4 |
| Gardner colour index _____ | 8 |
| Melting point _____ ° C__ | 249 |
| Pentaerythritol _____ percent__ | 96.5 |
| Dipentaerythritol _____ do____ | 3.5 |

The quantity of pentaerythritol recovered during its crystallization was thus about 90% of the quantity contained in the synthesis solution.

The residuate filtrate from the second crystallization contained pentaerythritol and non-crystallizable organic impurities; it could be concentrated under vacuum to obtain, after cooling, a further yield of crystallized pentaerythritol which was less pure than the two first yields; it could also be recycled to any desired stage of the separation, for example to the first evaporation stage, in order to favour the transformation of the organic impurities which is contained.

*Example 2*

1056 parts of an aqueous synthesis solution of trimethylopropane containing 95 parts of trimethylolpropane and 55 parts of calcium formate were concentrated so as to obtain 634 parts of solution. 100 parts of technical dimethyl formamide were added to this solution; the mixture was evaporated under atmospheric pressure. So as to eliminate all the water, the evaporation was continued until the temperature of the vapor reached 120° C. The calcium formate precipitated; the precipitate obtained was dried and then washed with 50 parts of dimethyl formamide. 54 parts of calcium formate of 92% purity were recovered.

The filtrate containing trimethylolopropane was concentrated under reduced pressure and its volume was reduced to 118 parts; 150 parts of technical methyl acetate were added. The crystals were cooled to 0° C., dewatered and dried. 68.5 parts of a first yield were obtained having the following characteristics:

| | |
|---|---|
| Ash content _____ percent__ | 0.00 |
| Gardner colour index _____ | 7 |
| Melting point _____ ° C__ | 48 |

On washing or recrystallizing from ethyl acetate, this first yield allowed a product to be obtained having the following characteristics:

| | |
|---|---|
| Ash content _____ percent__ | 0.00 |
| Gardner colour index _____ | 4 |
| Melting point _____ ° C__ | 55 |

The ethyl acetate in this filtrate was recovered by evaporation. The residue was evaporated under vacuum to obtain 37 parts of a syrup. After cooling, dewatering and drying, 10 parts of a second yield were obtained which was less pure and had the following characteristics:

| | |
|---|---|
| Ash content _____ percent__ | 0.24 |
| Gardner colour index _____ | 8 |
| Melting point _____ ° C__ | 47.5 |

The quantity of trimethylolpropane recovered in the two crystallizations was thus about 83% of the quantity contained in the synthesis solution.

The residual filtrate of the second crystallization contained 16.5 parts of trimethylolpropane. This syrup could be reconcentrated to obtain a third yield, or, better, distilled under vacuum to pure trimethylolpropane. This syrup could also be recycled to any desired stage in the separation, for example to the first evaporation.

*Example 3*

250 parts of dimethyl formamide were added to 1300 parts of an aqueous synthesis solution of trimethylolethane containing 103 parts of calcium formate. The mixture was evaporated under atmospheric pressure. In order to eliminate all the water, the evaporation was continued until the temperature of the vapour attained 120° C. A precipitate of calcium formate was obtained; this was dried and washed with 50 parts of dimethyl formamide. 103 parts of calcium formate of 98% purity were obtained.

The filtrate containing the trimethylolethane was distilled under reduced pressure and its volume reduced to 100 parts. It was cooled to 10° C.; the crystals were washed in cold acetone and then dried. 39 parts of a first yield were obtained having the following characteristics:

| | |
|---|---|
| Ash content _____percent__ | 0.081 |
| Gardner colour index _____ | 3 |
| Melting point _____° C__ | 197.5 |

The new filtrate containing trimethylolethane dissolved in the cold in dimethyl formamide was again concentrated under reduced pressure. Its volume was reduced to 40 parts. It was cooled and then 20 parts of a less pure yield were obtained.

The filtrate obtained from the second yield contained various quantities of trimethylolethane which could be recycled to any desired stage of the separation, for example to the first evaporation.

It is to be understood that the invention is not limited to the embodiments described above but can be carried out with various modifications.

We claim:

1. In a process for the production of a polyalcohol selected from the group consisting of trimethylolethane, trimethylolpropane and pentaerythritol, wherein formaldehyde and an aliphatic carbonyl compound are reacted in an aqueous alkaline medium to form a solution containing the desired polyalcohol and the formate of a basic metal, the steps of adjusting the pH of said solution to 4 to 7, removing any unreacted formaldehyde from the solution, adding to the solution a N-dialkyl-substituted amide of the formula

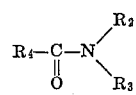

wherein $R_4$ represents a member selected from the group consisting of hydrogen and lower alkyl and $R_2$ and $R_3$ each represent lower alkyl, concentrating the resulting mixture at a temperature of from 50° to 130° C. to eliminate water and precipitate said metal formate therefrom, separating the precipitated metal formate from the resultant liquor, and recovering the desired polyalcohol from said liquor by crystallization.

2. In a process for the production of a polyalcohol selected from the group consisting of trimethylolethane, trimethylolpropane and pentaerythritol, wherein formaldehyde and an aliphatic carbonyl compound are reacted in an aqueous alkaline medium to form a solution containing the desired polyalcohol and the formate of a basic metal, the steps of adjusting the pH of said solution to 4 to 7, removing any unreacted formaldehyde from the solution, adding to the solution a N-dialkyl-substituted amide of the formula

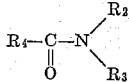

wherein $R_4$ represents a member selected from the group consisting of hydrogen and lower alkyl and $R_2$ and $R_3$ each represent lower alkyl, concentrating the resulting mixture at a temperature of from 50° to 130° C. to eliminate water and precipitate metal formate therefrom, separating the precipitated metal formate from the resultant liquor, recovering a first yield of the desired polyalcohol by crystallization, subjecting said liquor to a second concentration at a temperature below 120° C. to remove a substantial proportion of the N-dialkyl-substituted amide and recovering a second yield of the desired polyalcohol by crystallization.

3. In a process for the production of a polyalcohol selected from the group consisting of trimethylolethane, trimethylolpropane and pentaerythritol, wherein formaldehyde and an aliphatic carbonyl compound are reacted in an aqueous alkaline medium to form a solution containing the desired polyalcohol and the formate of a basic metal, the steps of adjusting the pH of said solution to 4 to 7, removing any unreacted formaldehyde from the solution, adding to the solution a N-dialkyl-substituted amide of the formula

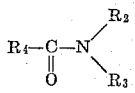

wherein $R_4$ represents a member selected from the group consisting of hydrogen and lower alkyl and $R_2$ and $R_3$ each represent lower alkyl, concentrating the resulting mixture at a temperature of from 110° to 120° C. to eliminate water and precipitate metal formate therefrom, separating the precipitated metal formate from the resultant liquor, recovering a first yield of the desired polyalcohol by crystallization, subjecting said liquor to a second concentration under reduced pressure and at a temperature below 120° C. to remove a substantial proportion of the N-dialkyl-substituted amide and recovering and purifying by crystallization a second yield of the desired polyalcohol.

4. The process set forth in claim 2, wherein the second concentration is carried out under reduced pressure.

5. The process set forth in claim 3, wherein the N-dialkyl-substituted amide is selected from the group consisting of N-dimethyl formamide, N-dimethylethanamide, N-dimethylethanamide, N-diethyl formamide and N-dipropyl formamide.

References Cited in the file of this patent
UNITED STATES PATENTS
2,696,507  Cake _____ Dec. 7, 1954